United States Patent [19]

Cheng

[11] Patent Number: 5,233,826
[45] Date of Patent: Aug. 10, 1993

[54] METHOD FOR STARTING AND OPERATING AN ADVANCED REGENERATIVE PARALLEL COMPOUND DUAL FLUID HEAT ENGINE-ADVANCED CHENG CYCLE (ACC)

[76] Inventor: Dah Y. Cheng, 12950 Cortez La., Los Altos Hills, Calif. 94022

[21] Appl. No.: 942,150

[22] Filed: Sep. 8, 1992

Related U.S. Application Data

[62] Division of Ser. No. 679,444, Apr. 2, 1991, Pat. No. 5,170,622.

[51] Int. Cl.$^5$ .............................................. F02C 7/00
[52] U.S. Cl. ................................................. 60/39.05
[58] Field of Search ................. 60/39.05, 39.182, 39.3, 60/39.53, 39.54, 39.55, 39.141

[56] References Cited

U.S. PATENT DOCUMENTS

| | | | |
|---|---|---|---|
| 3,978,661 | 9/1976 | Cheng | 60/39.55 |
| 4,128,994 | 12/1978 | Cheng | 60/39.05 |
| 4,297,841 | 11/1981 | Cheng | 60/39.3 |
| 4,393,649 | 7/1983 | Cheng | 60/39.05 |
| 4,424,668 | 1/1984 | Mukheujec | 60/39.182 |
| 4,507,914 | 4/1985 | Rice | 60/39.182 |
| 4,597,256 | 7/1986 | Hamill et al. | 60/39.05 |
| 4,660,376 | 4/1987 | Johnson | 60/39.05 |
| 4,685,288 | 8/1987 | Cheng | 60/39.55 |
| 4,735,043 | 4/1988 | Hamill et al. | 60/39.05 |
| 4,823,546 | 4/1989 | Cheng | 60/39.04 |
| 4,841,721 | 6/1989 | Patton et al. | 60/39.05 |

OTHER PUBLICATIONS

Jones et al. "Design & Construction of the First Commercial Cheng Cycle Series 7 Cogeneration Plant". ASME Paper 85-I67-122.
Keller et al. "Cheng Cycle Brings Flexibility to Steam Plant". *Power Engineering*; Nov. 1986.
Efron "Cheng Cycle Cogen. Picked to Handle Erratic Plant Load". *Energy User News*, vol. 10, No. 10; Mar. 11, 1985.
Kellcher, "Second Generation Cheng Conquers $NO_x$ Problem" *Modern Power Systems*; Jan. 1989.
Kosla et al. "Inject Steam in a Gas Turbine—But Not Just for $NO_x$ Control". *Power*; Feb. 1983.
Katzel, "Dual-Fluid-Cycle Turbine Makes Cogeneration, More Practical". *Plant Engineering*; Jun. 23, 1983.
Farmer, "Dual-Fluid 501k Rated 5.1 Mus with 38% Efficiency". *Gas Turbine World*; Nov. 1981.
Jones et al., "Operating Flexibility & Economic Benefits of a Dual Cycle 501-KB Gas Turbine", ASME Paper 82-G7-298.
Sims, "More Efficient Cogeneration" New York Times; May 22, 1986.
"Cheng Cycle Reporting High Availability". *Alternative Sources of Energy Magazine*; Feb. 1986.
Koloseus et al. "The Cheng Cycle Offers Flexible Cogeneration Options". *Modern Power Systems*; Mar., 1985.

*Primary Examiner*—Louis J. Casaregola
*Attorney, Agent, or Firm*—Peter A. Luccarelli, Jr.

[57] ABSTRACT

A method of operation of an Advanced Cheng Cycle heat engine comprising: (a) initializing start conditions in the gas turbine engine and the heat recovery steam generator with the control system; (b) setting the control valve means for idle flow condition of the heat engine; (c) pressurizing the drum with the compressed gas source to approximately the desired operating pressure of the heat recovery steam generator; (d) starting the gas turbine engine from idle to full load as limited by maximum allowed turbine inlet temperature; and (e) throttling second working fluid flow rate with the control valve means and shutting off the compressed gas source, after the sensor system indicates that heat recovery steam generator pressure is higher than compressor discharge pressure. Throttling is performed in accordance with the following operating parameters: (i) second working fluid temperature as injected into the turbine less than or substantially equal to first working fluid temperature at the compressor outlet, and (ii) maximization of heat recovery from the turbine exhaust for a given peak efficiency mixture ratio of second working fluid to first working fluid in the turbine, so that heat recovery exchanger pinch temperature is minimized.

5 Claims, 7 Drawing Sheets

METHOD FOR STARTING AND OPERATING AN ADVANCED REGENERATIVE PARALLEL COMPOUND DUAL FLUID HEAT ENGINE-ADVANCED CHENG CYCLE (ACC)

This is a divisional of application Ser. No. 07/679,444 filed Apr. 2, 1991 (U.S. Pat. No. 5,170,622).

BACKGROUND—FIELD OF INVENTION

Advancement in Cheng Dual Fluid Cycle heat engine to convert heat to power output efficiently.

BACKGROUND—DESCRIPTION OF PRIOR ART

The present invention relates to the heat engine, and, more particularly, to the improvement in efficiency and output over and above the parallel regeneration Dual Fluid Cycle or Cheng Cycle in a number of prior patents (4128994, 3978661, 4248039, 4128994, 4297841, 4417438).

To recap the background of the previous patents and publications, the Cheng Cycle is a heat regenerative gas turbine utilizing water-steam only in a heat recovery steam generator (HRSG) in a particular way that the steam is heated to as high a superheated temperature as possible (limited by the exhaust temperature of the turbine), and total heat recovery is maximized, limited only by heat transfer physics at the transition from the water to the evaporative phase of the boiler and the available gas stream temperature differences. This is known as the neck temperature in the HRSG industry. Patented at that condition, the Cheng Dual Fluid Cycle will reach a peak efficiency mixture ratio of liquid to gaseous working fluid, called XMIX peak. The anticipated efficiency gain and its simplicity of operation were cited in aforementioned patents, in literature, and through real operational data.

The Cheng Cycle was first commercialized using an Allison Model 501KH gas turbine, then a Kawasaki M1-ACC. Since 1984, ten Cheng Cycle 501KHs have been put into operation, and two Kawasaki Cheng Cycles are in operation in Japan. Numerous operational patents and variations to the turbine have been incorporated.

While the Cheng Cycle system has enjoyed all the benefits cited, it also suffers from an oversight of the inventor, Dr. Dah Yu Cheng (the current inventor of the Advanced Cheng Cycle [ACC]). The same gas turbine with a complicated steam turbine can be configured as a combined cycle. Although not able to improve by the same order of magnitude in power output, it has a reputation of having a potentially slightly higher efficiency than the Cheng Cycle. This is due to the fact that when the Cheng Cycle was conceived in the 1970's, the majority of gas turbines were operating at a metallurgically tolerable turbine inlet temperature for stress and corrosion protection. The Cheng Cycle was conceived at that time without consideration to blade cooling. The trend at that time was going towards ceramic turbines, even internally water cooled turbine blades. The advancement in cooling by bleeding compressor air through a cooling passageway, which is then strategically injected at a stagnation point and pressure side of the trailing edge of the blade, has allowed the gas stream temperature to increase dramatically without increasing the surface temperature of the turbine blade beyond the formerly uncooled metallurgical working temperature limit.

Bleeding compressor air certainly is a loss to the gas turbine system, but the ability to increase the operating temperature of the turbine more than made up for that loss. This resulted in an increased compressor pressure ratio and also allowed the simple gas turbine cycle efficiency to increase. Up to 10% bleed air is used in advanced fighter gas turbines, with a turbine inlet temperature over 2750° F. For industry, an efficiency increase of 1% is considered a major achievement. The new G.E. Frame 7-F has a turbine inlet temperature of 2350° F., but is still designed with a relative low pressure ratio so that the exhaust temperature can be high enough to improve the steam cycle part of the combined cycle. A combined cycle efficiency of over 50% has been claimed.

It has become obvious that maximum superheat can improve an uncooled gas turbine converted into a Cheng Cycle, and that it runs into difficulty in terms of being able to operate at that gas turbine inlet temperature without the steam injection of the Cheng Cycle.

In Table 1, Allison's turbine performance guarantees, it shows in the last two columns the 501KH and the 501KH with steam injection. The 501KH shows a turbine inlet temperature of 1895° F., and the 501KH with steam injection has a turbine inlet temperature of 1800° F. The loss of 95° F. available temperature means 3.0+% efficiency loss potential and 1000 KW more power output possibility. The root cause for the problem has been that when energy is recovered at highest thermodynamic potential, in other words, highest (maximum) temperature for steam (see prior patents), knowing that additional fuel needs to be burned to bring the steam to the turbine inlet temperature, the steam temperature becomes much higher than the compressor air discharge temperature. Mixing of the steam and the compressor discharge air results in a higher mixture temperature than compressor discharge temperature.

When bleed air passageways were designed to have a cooler compressor air discharge temperature, the higher mixture temperature resulted in the loss of cooling capacity of the blade surface. The only way to limit the blade surface temperature would be to reduce turbine operating

TABLE 1

| | Allison Industrial Gas Turbine Engine Specifications 501-K Specifications | | | | |
| --- | --- | --- | --- | --- | --- |
| Model Designation | 501-KB5 | 501-KF | 501-KC5 | 501-KH | 501-KH Steam Injection③ |
| Operating Conditions | International Standard Day-Sea Level-No Losses 59° F./15° C.- Nominal Steam Injected③ | | | | |
| Continuous HP (kW)① | 5263(3925) | 4330(3229) | 5278(3936) | 5263(3925) | 7966(5943) |
| Fuel Consumption MBTU/HR | 44.356 | 40.075 | 46.716 | 44.356 | 51.358 |
| SFC lb/HP-HR (kg/kW-HR) | .458(.277) | .503(.305) | .481(.292) | .458(.277) | .316(.192) |
| Weight lb. (kg) | 1270(576) | 2500②(1134) | 1130(512) | 1270(576) | 1270(576) |
| Length in. (mm) | 90(2286) | 105②(2667) | 72(1828) | 90(2286) | 90(2286) |
| Width in. (mm) | 32.2(843) | 55.190②(1401) | 33.0(838) | 32.2(843) | 32.2(843) |

TABLE 1-continued

| | Allison Industrial Gas Turbine Engine Specifications 501-K Specifications | | | | |
|---|---|---|---|---|---|
| Model Designation | 501-KB5 | 501-KF | 501-KC5 | 501-KH | 501-KH Steam Injection③ |
| Height in. (mm) | 36.1(917) | 54.25②(1378) | 41.0(1041) | 36.10(917) | 36.10(917) |
| Calculated TIT F.°(C.°) | 1895(1035) | 1800(982) | 1895(1035) | 1895(1035) | 1800(982) |
| Exhaust Gas Temp F.° (C.°) | 991(533) | 994(534) | ④ | 991(533) | 977(525) |
| Exhaust Gas Flow lb/sec (kg/sec) | 34.57(15.7) | 33.86(15.4) | 34.42(15.6) | 34.57(15.7) | 39.5(17.9) |
| RPM | 14200 | 13820 | 13820 | 14200 | 14200 |

①Based on gaseous fuel
②Includes power turbine
③Based on 5 lb/sec steam injection at 90° F.
④Dependent upon power turbine selected.

temperature. This will cause loss of potential efficiency and output, and therefore results in higher cost for the machine.

This invention points out the advancement to the Cheng Cycle, called Advanced Cheng Cycle (ACC), which overcomes those limitations. The hardware configuration of the ACC follows, to a great extent, the old design in valve location, control systems, startup and shutdown processes. A number of difficulties which were encountered with the original Cheng cycle will also be improved upon by this disclosure.

OBJECT AND ADVANTAGES

Several objects and advantages of the present invention are:

(a) It alleviates the turbine inlet temperature reduction when using steam injection in a gas turbine so maximum turbine designed temperature for gas only can be available for Cheng Cycle;

(b) offers a choice of cooling means, which can increase turbine inlet temperature blade cooling of the gas turbine;

(c) improves efficiency beyond the Cheng Cycle by increased turbine inlet temperature, which maintains turbine blade surface temperature;

(d) a new configuration of steam control valve is introduced to prevent rusting in the superheater;

(e) a reduction of the superheater surface area;

(f) increased power output efficiency by increased compressor discharge pressure;

(g) provides a means for fast start of the Advanced Cheng Cycle; and (h) retains cogeneration mechanical (electric power) and steam to follow the fluctuating load independently.

DESCRIPTION-FIGS. 1-12

Figure 1:
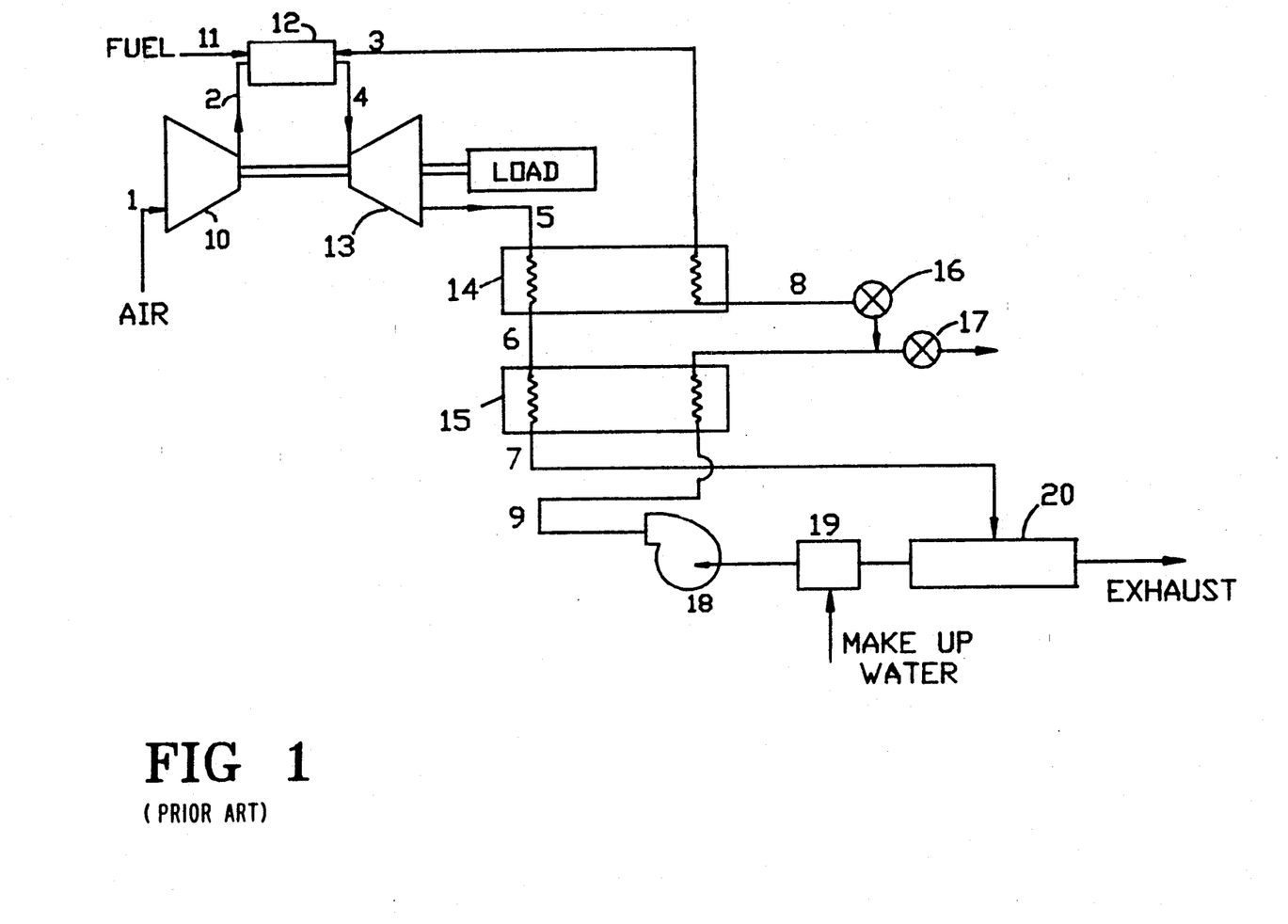
FIG. 1 illustrates the Cheng Cycle as configured in a series of patents filed in the 1970's by the inventor.

FIG. 1 illustrates the embodiment of the Cheng Cycle according to prior art patents. The configuration indicates the gas turbine has a compressor 10 linked to a turbine 13 by shaft and output to a load. The air intake to compressed air through 1 is being compressed and discharged at 2. The compressed air enters a combustion chamber 12. Fuel is entering the combustion chamber through 11, and steam comes from the heat recovery steam generator (HRSG) to 3. The mixing of the combusted air and steam reaches a predetermined turbine inlet temperature, then discharges at 4 through turbine 13, exiting at the turbine 5. Exhaust gas then passes through the heat recovery steam generator, which is divided into two parts, a superheater 14, and a water to steam generator 15. The hot exhaust gas enters the superheater 14, gives up the heat to superheat the steam entering at 8 and exiting at 3. A duct burning capability is not depicted here, normally located at 6. The remainder of the heat is recovered by the unit evaporator 15 and exits at 17. The exhaust gas has the option of going through a cleanup or condensing unit 20, then to the atmosphere. Water can be recovered through 20 or can be totally used as a makeup entering or mixing with 19. Water is compressed to a high pressure through a pump 18. The pump exit goes into the steam generator 9 and the evaporator is controlling the steam flow by two valves 16 into the superheater, or to a steam user as a cogeneration unit 17. If used for power generation only, 17 is no longer needed.

The above description of this component diagram is typical of the Cheng Cycle configuration described and patented in the prior art patents.

Figure 2:
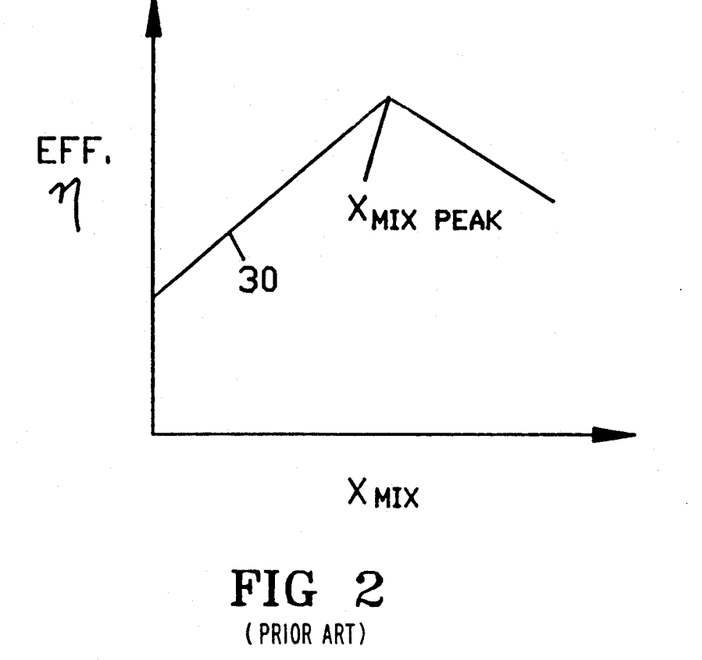
FIG. 2 illustrates the peak efficiency aspect of steam to air mixture ratio of the Cheng Cycle in the prior art.

FIG. 2 is an efficiency versus steam to air ratio defined as XMIX such that for a given turbine inlet temperature 30, the efficiency will reach a peak, then drop off with even more steam injection. This peak efficiency is the nature of the heat recovery as described in the Cheng Cycle patents and the most important claims, and can be seen in FIG. 3.

Figure 3:
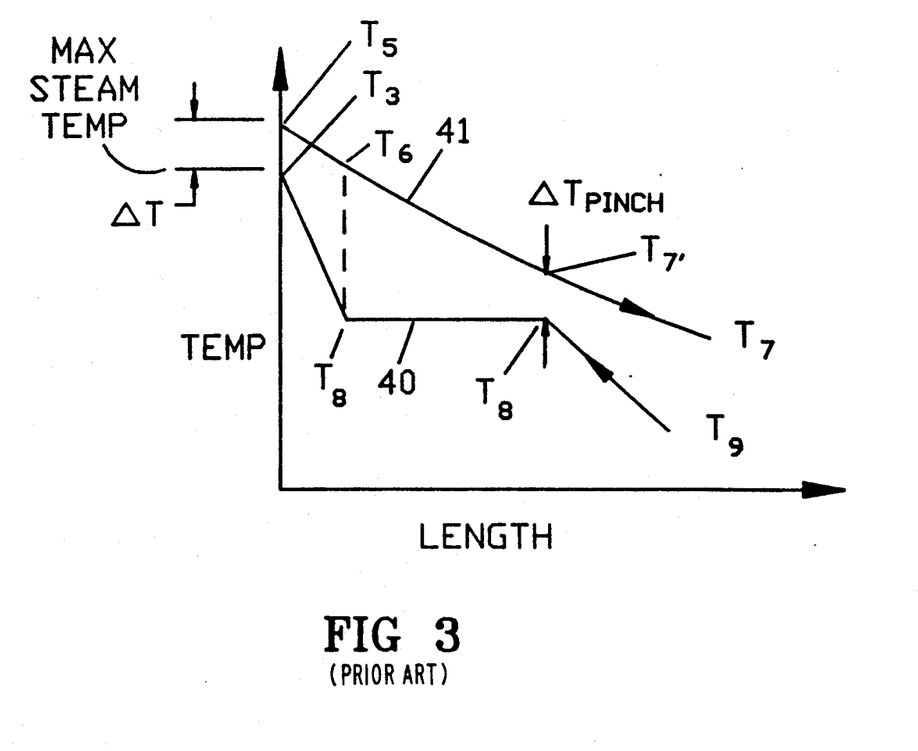
FIG. 3 illustrates the heat transfer limitation to reach maximum heat recovery and maximum superheat as claimed in the prior art.

FIG. 3 is the exhaust temperature profile and the heat transfer to the HRSG by converting water into high temperature steam. The length indicated is the path length of the heat exchanger in HRSG. The exhaust gas entering the heat exchanger as described in FIG. 1 is depicted here as temperature T5. The temperature is dropped to T6 by superheating the steam from T8 to T3. The temperature continuously drops on the exhaust side from T6 to T7 and continues down to the exhaust T7. The water is entering at T9, reaches the evaporation point for given pressure at T7, and the evaporation is taking place according to the profile 40. The exhaust profile is 41. The temperature difference between the boiler in temperature and exhaust temperature at the smallest point indicated by (T7, - T8) is referring to a Delta $T_{pinch}$ or neck. The temperature difference between T5 and T3 is referred to as a Delta $T_{maximum}$. The maximum enthalpy and the maximum heat recovery in the prior art requires that the upper pinch point Delta $T_{max}$ and T7' minus T8 to be minimized. At that point the peak XMIX is reached.

Figure 4:
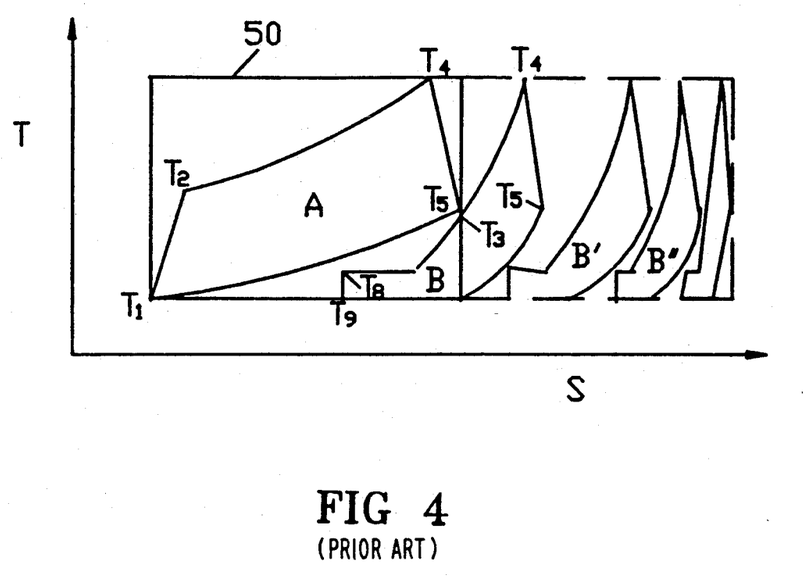
FIG. 4 is a temperature and entropy diagram describing cycle efficiencies of the Cheng Cycle as demonstrated in the prior art.

FIG. 4 is a temperature entropy diagram in the industry referred to as a T-S diagram. S represents the entropy. The box 50 is referred to as a Carnot Cycle box, and the area indicated inside of the box is the gas turbine cycle diagram such that it consists of four sides. The compression side is indicated by the temperature rise with increased entropy S from T1 to T2. The combustion is taking place to raise the temperature from T2 to T4.

In the gas side, the expansion through the turbine is dropping the temperature from T4 to T5. Before the gas exits the power plant, it enters the heat recovery boiler. The temperature is dropping through a profile on the bottom to complete the cycle. The square box 50 represents the temperature T4 and the temperature T1 bound by the turbine inlet temperature and ambient temperature of the gas turbine, which is defined as the Carnot Cycle of the gas turbine efficiency.

To improve the efficiency of such a cycle is to maximize the area of a cycle filled inside the Carnot Cycle. The Carnot Cycle efficiency is usually defined as efficiency equal to 1 minus T1 divided by T4 such that the higher the T4, the higher the Carnot Cycle efficiency. The Carnot Cycle has no indication of the participation by the entropy, therefore the width of the Carnot Cycle box does not enter into play to define the cycle efficiency.

The water side of the cycle starts from T9, reaches temperature T8, then the superheated temperature T3 is trying to fill the corner of the Carnot Cycle box. Steam is then further heated from T3 to T4, then expanded synergistically with the air to the same temperature T5. The heat from the steam is also recovered by the additional steam, indicated by the boundary of the box B'. The B' goes through the same cycle and will recover additional steam, B''. Therefore, the Cheng Cycle heat regeneration is a series of heat recovery cycles by steam with maximum heat recovery and maximum entropy to fill the Carnot Cycle box as tightly as possible as a means to increase its efficiency. The area increase between A plus B then B' and B'' and so on is the potential of the power output increase of the Cheng Cycle. As was described in the prior art patent, the competing cycle usually is described as a combined cycle such that the combined cycles do not inject steam into the gas turbine, rather it goes through a separate steam cycle.

Figure 5:
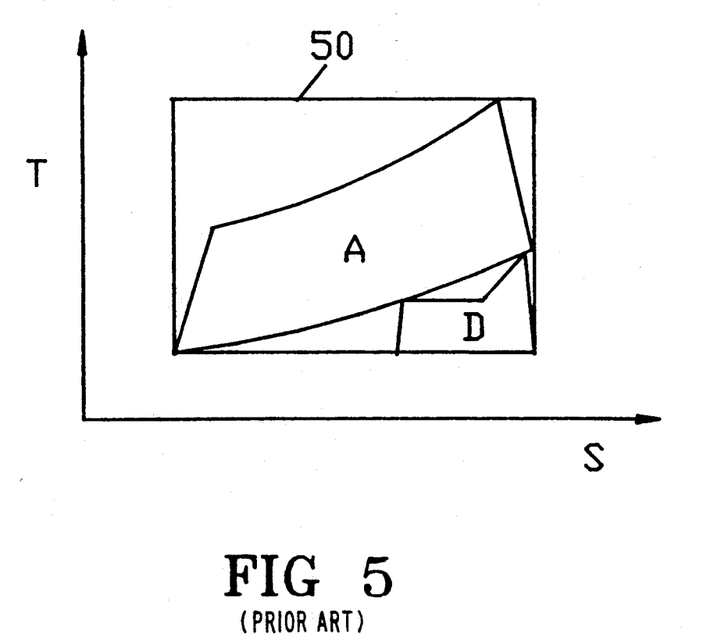
FIG. 5 is a combined cycle temperature and entropy diagram using a gas turbine and steam turbine cycle for heat regeneration.

Such a cycle is depicted in FIG. 5. The carnot box 50 is the gas turbine part of the Carnot box; however, a steam cycle will occupy the bottom corner of the empty part of the carnot box below the gas turbine cycle A. The steam cycle is indicated by area D. The steam cycle D normally is a high pressure steam, compared to the Cheng Cycle, which is at a lower pressure. Therefore, the potential for power increase is not as great as with the Cheng Cycle.

Figure 6:
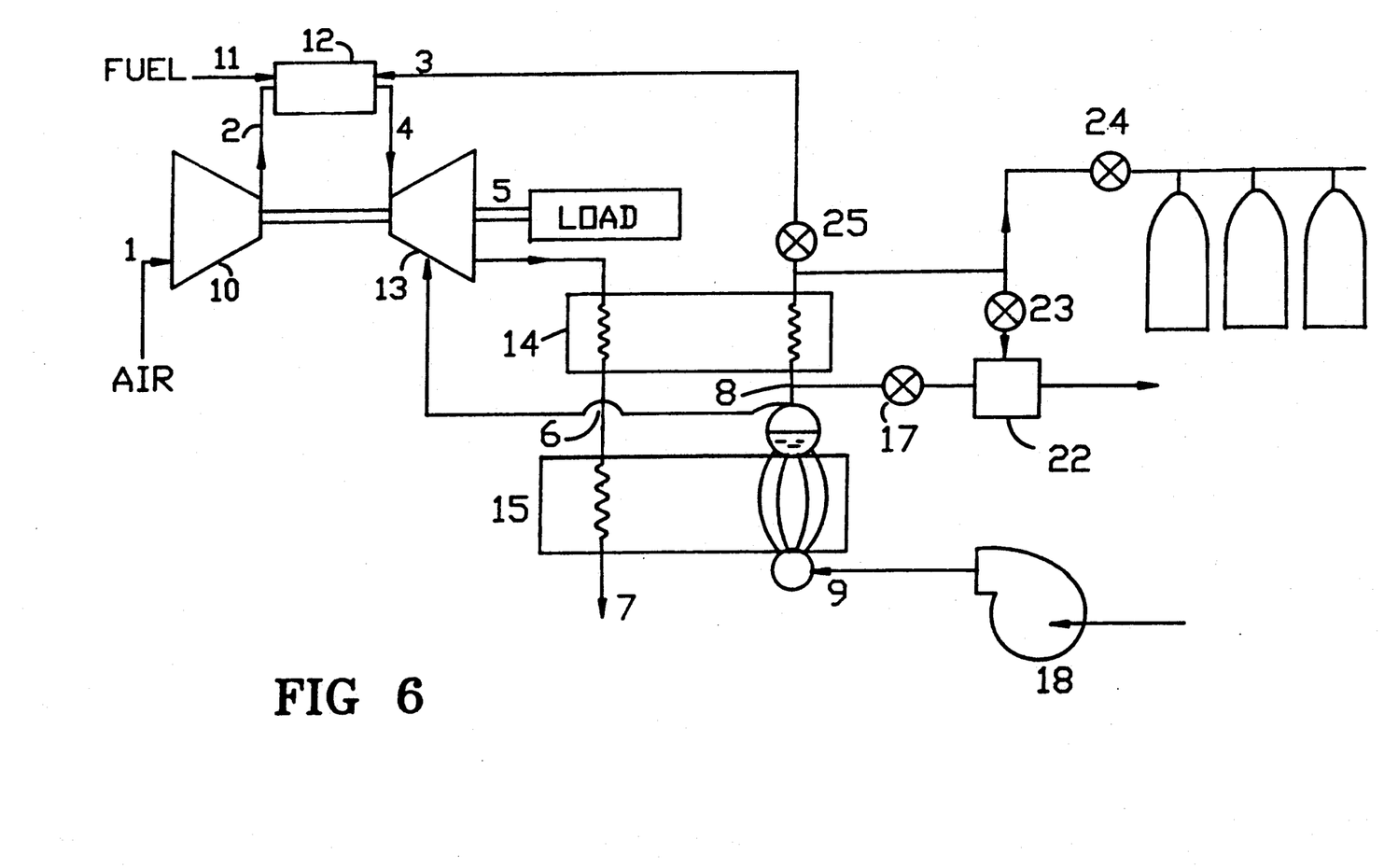
FIG. 6 illustrates the new Advanced Cheng Cycle configuration, including new control valve locations.

FIG. 6 illustrates the Advanced Cheng Cycle system. The Advanced Cheng Cycle system has a compressor 10 and a turbine 13 linked by shaft and output to the load. Air also comes in at 1, is discharged after the compression at 2 into the combustion chamber 12. Fuel is entering at 11. Steam from the heat recovery generator comes at 3, and the premix to a predetermined turbine inlet temperature is limited by the metallurgy temperature allowed at T4. The mixture gas then expands through the turbine 13 and exhausts at turbine 5. The exhaust gas goes into a superheater 14 and then goes to an evaporator 15 and out of the evaporator at 7. The location between the superheater and the evaporator indicated by 6 can also incorporate additional duct burning for steam generation in the boiler.

On the water side, pretreated water enters into the pump 18 is discharged into the boiler 9 and evaporates into saturated steam, which would have three possible paths. Path one is a small amount of bleed through the boiler to the power turbine 13 for the primary purpose of cooling turbine blades and nozzles. Path two is entering the superheater and discharged. The superheater again has two paths, one through the valve 23 and one through the control valve 25 which enters the steam into the combustion chamber 3. As indicated, the valve 25 control of the steam is different than the prior art patent for the reason that is was discovered that during the cogeneration operation sometimes the superheater with only a control valve between the superheater and the evaporator (indicated in FIG. 1), even using chromolly alloy, which has high nickel and chrome content, will still present a rust substance on the surface. While steam is then reintroduced due to load demands, this substance enters into the turbine combustion chamber and lodges into the passageway of the cooling blades as a red substance, which will cause blockage of the cooling air and burn up all the turbines. By optionally putting in the control valve at 25, which alone does not work, further steps are taken to make sure that when steam is not being used in the gas turbine and is used for cogeneration through valve 17 only, that a minimum amount of steam is going through the superheater such that a control by the control valve 23 mixed with the saturated steam at the mixing chamber 22 will provide the additional heat for cogeneration purposes. This minimizes the exposure of the wall area of the superheater where steam was not injected into the gas turbines. Additional valves are provided as an option at 24 such that a pressurized gas which will not cause corrosion, such as nitrogen or other excess neutralized gas, is used for the startup to control the pressure of the boiler system such that when the Advanced Cheng Cycle is started, the boiler is going to be boiling at a high pressure instead of having to evaporate at room temperature, then gradually build up the pressure in the boiler as a conventional means. This way we speed up the startup process by five-fold. This eliminates the need for linking the gas turbine part of the operation and the steam generation part of the operation, which the ordinary combined cycle has to do.

The advantage of this optional configuration is that it retains the pressurized boiler startup operation and independent steam to gas turbine operation so that the gas turbine can, in the case of an electrical generation, start to operate by the turbine to the limit of the inlet temperature as a simple gas turbine cycle, which normally only takes a few minutes. The high exhaust temperature at T5 was limited for the heat recovery boiler operation, because when boiling is happening at low pressure, the steam bubble occupies a large volume. That phenomena is called water swell in the boiler. So one has to bleed the water down at the high-high water mark until the boiler settles down.

In this case, the high temperature gas is going to the boiler, but the boiler is pressurized by, for example, the nitrogen bottle, which adjusts the boiler operating temperature and pressure (normally for this operation around 250 psi). The boiling temperature of the water will then be around 380° F. instead of 212° F. Therefore, the boiler can absorb the temperature quickly without concern with water swells. When the boiler finally reaches the 380° F. temperature, it starts to produce steam. The drum pressure will be higher than the allowed nitrogen pressurized pressure. The steam valve 25 will then be opened to first bleed the nitrogen out to maintain the boiler pressure until the steam production rate is high enough to completely empty the nitrogen. At that moment, the regulation of the nitrogen bottle will shut off the nitrogen flow altogether due to the fact that the drum pressure is higher than the nitrogen pressure. When that happens, high temperature water will not absorb any nitrogen gas, so no deaeration is required. All the nitrogen has been exhausted into the combustion chamber. The additional steam generated then starts to inject the steam into the combustion chamber until the boiler has reached the equivalent of the full amount of steam designed according to the design parameters, which can be injected through the control valve 25 to have increased loads and efficiency.

When steam is first introduced through the port 23, turbine inlet temperature will go down, so the fuel flow rate at 11 will increase to maintain turbine inlet temperature T4. Therefore, the power output will continue to increase without increasing the turbine inlet temperature until the full head of steam is generated. The turbine is now producing its maximum output at maximum efficiency.

If the bleed steam is not used to cool the turbines, then the steam temperature at 25 is limited to the gas turbine compressor discharge temperatures such that the cooling air is now provided internally to the turbine blades of the gas turbine, normally through the bypass through internal pass of the gas turbine. The bypass air is mixed with incoming steam to maintain the exhaust exit temperature of the compressor; therefore the coolant to the turbine blade will not exceed previously designed compressor discharge temperature limitations to maintain the turbine blade cooling.

In the case that the steam temperature at T3 is lower than the compressor discharge temperature, certainly that is an option of operational flexibility with a slight sacrifice of efficiency but increase of power output. The character is similar to what was described in the prior art (Cheng Cycle) except here the chosen parameter to reach the peak efficiency is now different and is controlled by this new invention.

Figure 7:
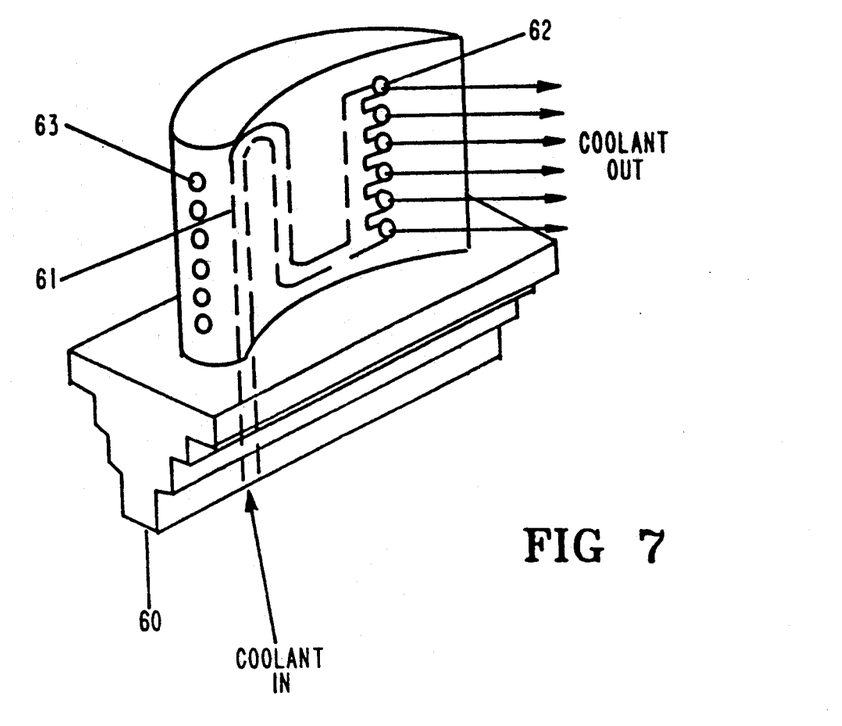
FIG. 7 illustrates a typical bleed air cooled turbine blade.

FIG. 7 depicts typical air bleed cooling for the turbine blades such that the coolant enters from the bottom of the blade through blade 60. The internal passage 61 cools the whole blade, but a certain amount escapes through the leading edge holes 63. After the coolant picks up the heat, it then exhausts at the trailing edge to protect further the heat transfer of the trailing edge. The cooled air then releases out of the holes 62.

Figure 8:
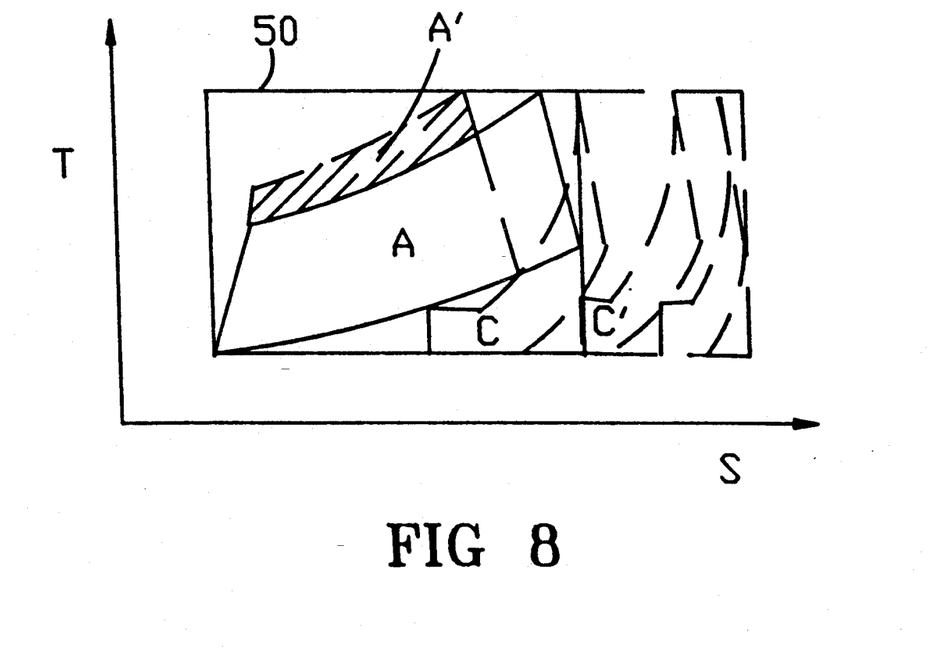
FIG. 8 illustrates the Advanced Cheng Cycle with increased pressure ratio.

FIG. 8 illustrates a different way to change the parameters in the Advanced Cheng Cycle than indicated in the prior art (Cheng Cycle) such that even with a given fixed turbine inlet temperature (T.I.T.), the compressor bleed air temperature normally will not be changed. However, from the operational map, the compressor can be back pressured. Recovering energy from upper gas turbine cycle in the Carnot Cycle box was not previously considered. The increased area due to increased pressure ratio is indicated by A' for a given T.I.T., and the entropy increase is reduced; therefore the shrinking of the Carnot Cycle box and a much fuller filling of the box is achieved and is due to the increased pressure ratio. However, as pointed out, the entropy never comes into play as far as efficiency is concerned. The Advanced Cheng Cycle increases the pressure ratio through the back pressure of the compressor with limits of a surge margin to recover energy at the upper side of the cycle diagram inside the carnot box.

Figure 9:
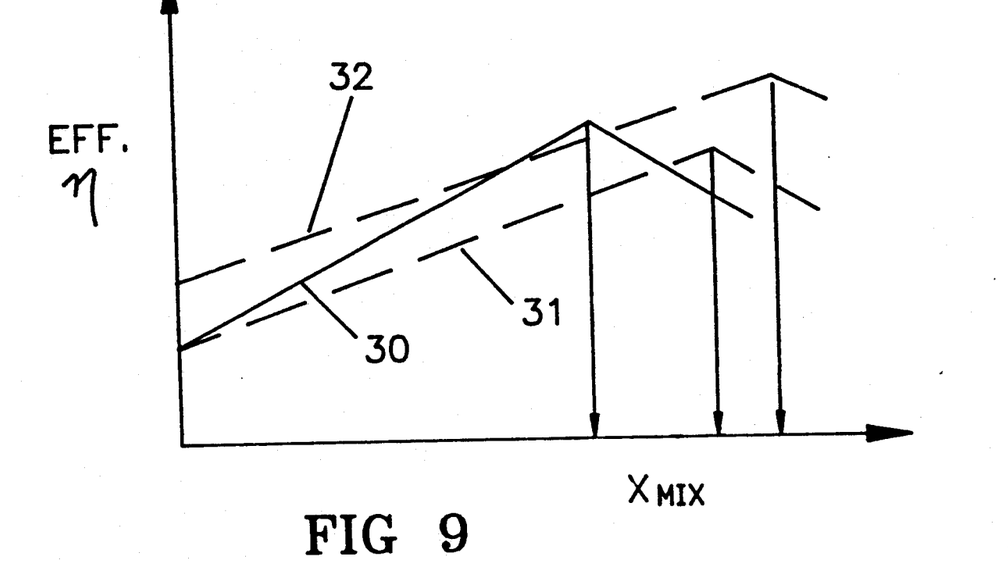
FIG. 9 illustrates a comparison of efficiency and the location of XMIX for peak efficiency between the prior art (Cheng Cycle) and the Advanced Cheng Cycle.

FIG. 9 illustrates the efficiency versus XMIX condition. 30 is the prior art steam injection rate for efficiency curve similar to the one depicted in FIG. 2. 31 assumes the same turbine inlet temperature. The steam recovery upper temperature is limited to the compressor air discharge temperature, which allows us to recover more steam before reaching peak efficiency, with, however, a slight drop in efficiency, as indicated in the prior art examples. Now, due to the fact that 30 is penalized by the steam injection, the actual operation of the Advanced Cheng Cycle should operate at a turbine inlet temperature 32, which has a peak efficiency even higher than the peak efficiency of 30. Even the temperature of the superheated steam is less than maximum superheat temperature in the prior art. Therefore, the efficiency is recovered or gained by the ability to recover the turbine inlet temperature limitation due to steam injection.

By steam preferential cooling of the cooling blades through saturated steam, which normally has a temperature lower than the compressor discharge temperature, this ability of increasing turbine inlet temperature can again be obtained with maximum steam temperature.

Figure 10:
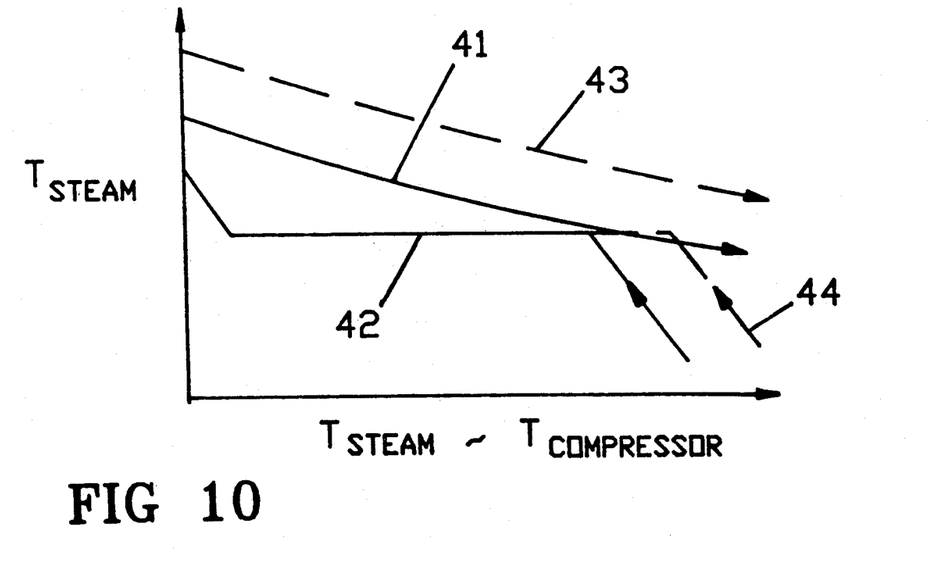
FIG. 10 illustrates the heat transfer differences in the heat recovery boiler and temperature profiles between the prior art (Cheng Cycle) and the Advanced Cheng Cycle.

FIG. 10 illustrates the heat transfer temperature profiles when we choose the steam temperature to be limited by the compressor exit temperature 42. Ordinarily the penalized turbine inlet temperature would have an exhaust temperature 41. However, since the turbine blade temperature can be kept constant as if no steam is being injected, one can operate at the higher inlet temperature 43. That indicates that the steam recovery is generated by 44 and more steam can be recovered. In other words, maximum steam energy will still be recovered, except the upper temperature is bound by the compressor air discharge temperature in this case such that the limitation of the turbine inlet temperature to a lower value is removed.

Figure 11:
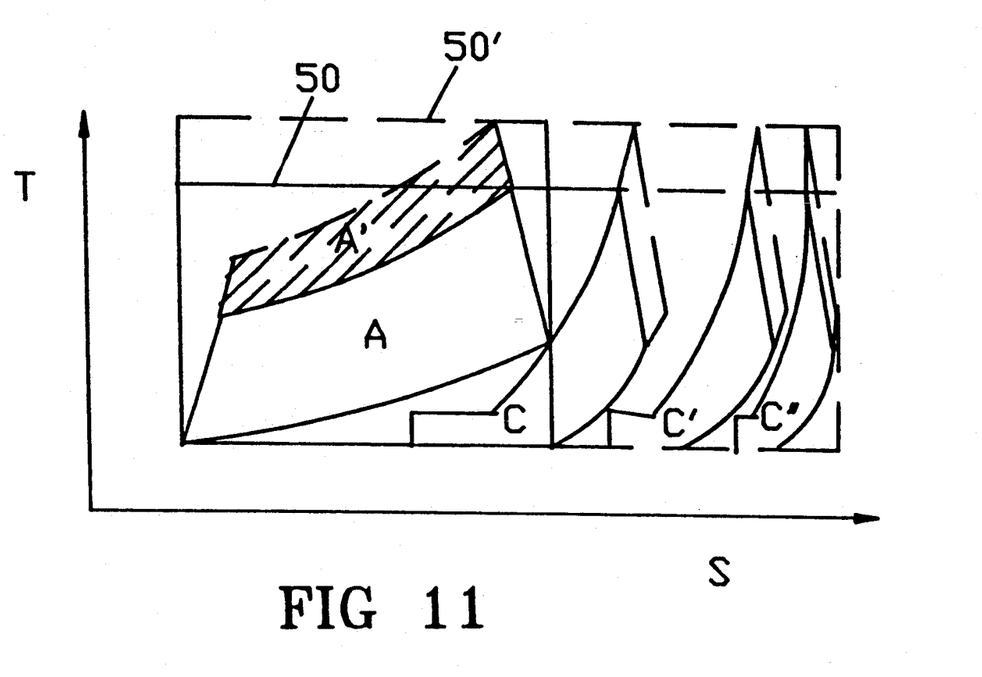
FIG. 11 illustrates the Advanced Cheng Cycle optimum description with increased turbine inlet temperature and increased pressure ratio.

FIG. 11 illustrates the incorporation of all of the Advanced Cheng Cycle features, changing the TS diagram of the prior art (Cheng Cycle). One can see first that the Carnot Cycle box would have a higher temperature 50', which means that inherent Carnot Cycle efficiency is improved. It's further improved by the higher pressure ratio indicated by the additional area A'. It is also further improved through the additional area which can be produced by the steam in the steam cycle as C, C', C", etc.

Figure 12:
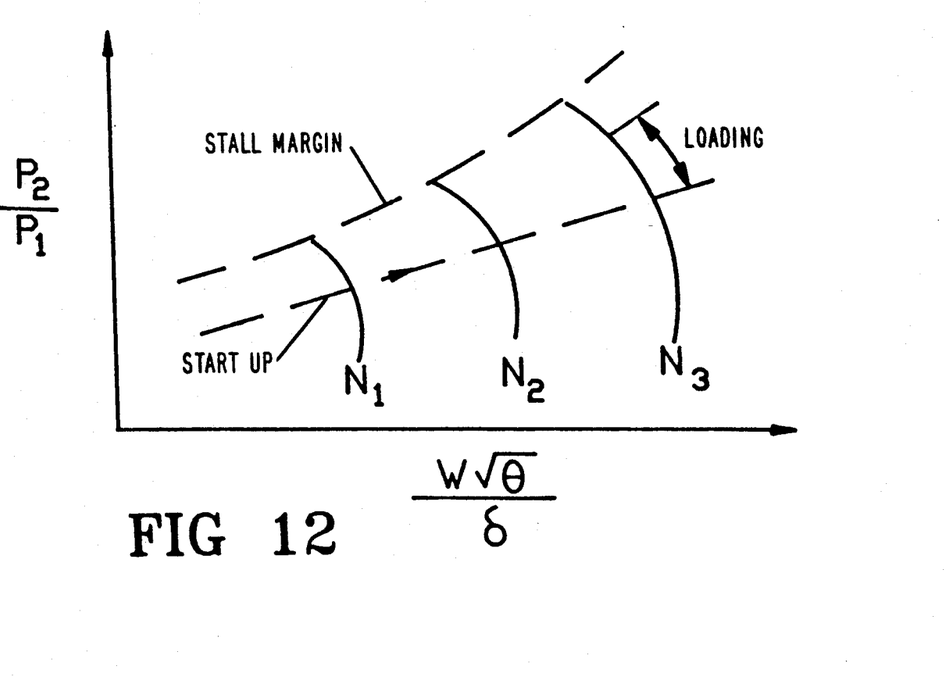
FIG. 12 illustrates the ability for the Advanced Cheng Cycle to increase combustion ratio through turbine matching and compressor map.

FIG. 12 illustrates the limitation of the compressor surge margin and pressure ratio increase. The flow rate is indicated by W square root theta divided by delta, which is the compensation for the turbine inlet temperature and ambient pressure conditions. On the vertical axis is the pressure ratio of the compressor discharge, and the lines $N_1$, $N_2$ and $N_3$ are constant compressor RPM lines. The dotted line represents the compressor stalling line, which is never to exceed pressure ratio lines. The startup of an ordinary gas turbine is matched through a startup line such that when high pressure is reached, it is normally obtained through a higher turbine inlet temperature and the RPM is increased. However, when it is used for a power generation case, then the turbine is running at a constant RPM.

In this case the RPM is $N_3$. The increase of power output is not due to the increase of RPM. Therefore, the increase of the turbine inlet temperature results into higher inlet flow volume required to go through the turbine blade areas, which will require a higher compression ratio. Therefore, for a simple cycle single shaft power generation operation, the surge margin of a compressor map is usually large to accommodate the idle condition of the turbine inlet temperature condition all the way to the fully loaded operations.

In the prior art (Cheng Cycle) consideration was given to open up the turbine areas so the surge margin would not exceed the compressor surge. However, the Advanced Cheng Cycle's accommodation of steam and higher temperature will not only be beneficial in closing down the turbine flow area in order to increase the pressure ratio, but will also result in higher efficiency and higher work output. This is why the Advanced Cheng Cycle can accommodate the high pressure ratio of the turbines.

OPERATION—FIGS. 1, 6

The operational description of FIG. 1, the prior art operation, is specified in fuel flow rates and efficiency, (as in the Allison catalog, Table 1) as an example based on the Cheng Cycle parameters such that the steam temperature is 50° F. below the exhaust temperature of the turbine. Due to the fact that the pressure ratio of the gas turbine is 9.3 and the compressor discharge temperature is lower; an example of the Advanced Cheng Cycle operation will be given such that the steam recovery temperature will be limited by the compressor discharge temperature of the gas turbine. An example of the energy balance and the improvement in efficiency and output is a comparison of the 1800° F. Cheng cycle operation, as limited by the current Allison guarantees to 1895° F. with gas turbine optional only (column 501KH in Table 1), and the Advanced Cheng Cycle with the turbine blade temperature now controlled by the superheat temperature of the steam at a lower chosen superheated temperature (see Table 2) relating to the compressor discharge temperature for a given turbine. For example

TABLE 2

COMPARISON OF PERFORMANCE IMPROVEMENTS BETWEEN CHENG CYCLE 501KH AND ADVANCED CHENG CYCLE 501KH

|  | C.C. 501KH | A.C.C. 501KH |
|---|---|---|
| MASS FLOW #/SEC $M_1$ | 33 | 33 |
| AMBIENT TEMPERATURE °F. | 59 | 59 |
| AMBIENT PRESSURE, PSIA | 14.7 | 14.7 |
| COMPRESSION RATIO | 11.2 | 11.6 |
| COMPRESSOR | | |
| EXIT TEMPERATURE °F., $T_2$ | 760 | $(745)^{(1)}$ 772 |
| EXIT PRESSURE, PSIA, $P_2$ | 164.64 | 170.52 |
| BLEED AIR, % × $M_1$ | 4 | 4 |
| BLEED AIR RECOVERY, % × $M_1$ | 2 | 2 |
| COMBUSTOR | | |
| PRESSURE LOSS, % $P_2$ | 5 | 5 |
| TURBINE INLET TEMPERATURE, °F. | 1800 | 1895 |
| FUEL IN, MBtu/HR | 39.17 | 42.42 |
| STEAM RATE, $X_{MIX}$ | 15.5 | 18.6 |
| TEMPERATURE, °F. | 900 | $(745)^{(1)}$ $700^{(2)}$ |
| PRESSURE, PSIG | 250 | 250 |
| TURBINE EFFICIENCY % | 88 | 88 |
| EXIT TEMPERATURE °F. | 953 | 1008 |
| EXIT PRESSURE PSIA | 15.21 | 15.21 |
| SHAFT NET OUTPUT HP | 8,576 | 10,203 |
| SHAFT EFFICIENCY, % | 42 | 45 |
| HRSG | | |
| OUT DELTA $T_{UPPER}$ °F. | 53 | 308 |
| DELTA $T_{NECK}$ °F. | 78 | 117 |

[1] Air compressor exit temperature without increasing exit pressure
[2] Due to increased heat conductivity in hot stream, slightly cooler steam HRSG temperature is recommended to maintain blade surface temperature
From the above Table II, the steam temperature is 200° F. cooler, and 45° F. cooler at maximum output compressor discharge temperature for ISO conditions. At hot summer and cool winter, the temperature should average at 700° F. The pinch (or neck) temperature is approximately 100° F. Efficiency is 3% better and output is 1,627 hp more.

only, the comparison of the prior art (Cheng Cycle) and the Advanced Cheng Cycle steam temperature will be 700° F.

Operation wise, it's obvious from the figures that the superheater of the unit will be smaller, and since the heat transfer into the evaporator has such a large temperature difference, the surface area increase due to additional steam generation is not sufficiently large, so the overall boiler cost will come down. On the other hand, the efficiency and the power will both increase, resulting in the Advanced Cheng Cycle product having *higher efficiency* and *lower manufacturing cost*, therefore indicating a commercial advantage to compete in the marketplace.

The startup procedure of the Advanced Cheng Cycle can be seen in FIG. 6. The valve 25 is closed until demand for the steam injection. The boiler is pressurized either by the heat remaining in the boiler to a designated pressure, or optionally pressurized by the nitrogen bottle through the control regulator valve 24. On the startup, the gas turbine will be starting up assuming it has no steam injection and to reach the designated turbine inlet temperature for its gas simple cycle operations first. The very high exhaust temperature T5 will quickly generate steam through the steam generating units 14 and 15, regardless of the water level conditions in the boiler, which is totally different than any of the boiler operations we have today.

When the boiler pressure exceeds the designated pressure, then the steam valve 25 is gradually opened to maintain the drawn pressure such that steam is injected into the gas turbine. When a full head of steam is generated, the drum pressure 8 should be higher than the pressure set for the regulator by the valve 24. The steam rate will be synchronized through a control system with the turbine fuel flow. During load fluctuations, the steam will be injected according to a forward flow as anticipatory steam conditions, because we do have a higher pressure in the drum and necessarily have to wait for steam to be generated all the time. The coordination between the fuel flow and the steam flow will behave like a carburetor equivalent of an internal combustion engine such that turbine inlet temperature T4 will always be under control. Under partial load conditions, then T4 will be decreased and the maximum heat is going to be recovered by the heat recovery generators. In the case of a cogeneration operation at night where maximum steam is required, but minimum electrical load is required, steam is diverted totally through the cogeneration valve 17, and the valve 25 is closed and the valve 23 is opened slightly to bleed a small amount of saturated steam through the superheater to be mixed as the mixture chamber 22 for cogeneration operation. This protects the surface area of the superheater even when no steam is being injected into the gas turbine. The peak efficiency point for a given steam to air ratio, even limiting the steam temperature to the compressor discharge, is still true since the lower steam temperature will lose efficiency. The Advanced Cheng Cycle limits the upper temperature not by the exhaust temperature of the gas turbine, but by the discharge temperature of the compressor, which would allow additional heat to be generated in the form of additional steam. The cascading effect of more steam to generate even more steam is the unique aspect of the cycle which will make the whole Advanced Cheng Cycle to perform much better than the prior art (Cheng Cycle) without the limitation on the metallurgic temperatures of turbine blades, as was used in the prior art.

SUMMARY, RAMIFICATIONS AND SCOPE

To summarize the above described invention, the ability to change the turbine area to match the compressor characteristics in the past has been made to match the original compressor discharge pressure ratio by opening up the turbine flow area to accommodate additional steam. This by no means is true any more in Advanced Cheng Cycle in that the matching of the compressor discharge with additional steam will allow it to increase its pressure ratio only limited by the reasonable reserve surge margin for the compressor for a given design turbine inlet temperature. Therefore, when that happens, the compressor air discharge temperature will actually be higher than the original gas turbine operation only temperatures. Therefore, temperature below the actual compressor discharge temperature would be recommended to match the original discharge temperature for better turbine cooling applications. For that reason, the matching of the opening of the turbine areas will be as small as possible in order to back pressure the compressor to have a higher pressure ratio. Therefore, the parameters of the cycle in terms of pressure ratio, turbine inlet temperature and superheated temperature limiting the amount of steam is linked in such a fashion similar to the prior art (Cheng Cycle) but operates at a different domain in terms of steam to air ratios to reach the high efficiency and high output.

In the example of the 501KB to become KH with steam injection, the pressure ratio will be increased from 9.3:1 to 11.5:1. This will in turn increase its efficiency. Even the turbine inlet temperature is now adjusted to be operating at simple cycle gas turbine temperatures. The cycle is no longer limited by a singular point operation, as we see through the operation of the prior art Cheng Cycle, that in a cogeneration operation, steam can be toggled between cogeneration requirements and injection requirements for power. Additional duct burning can produce steam without counting on the waste heat from the turbine only so that the electrical power or mechanical output and the steam demand can be totally independent.

To advance the Cheng Cycle technology, the turbine inlet temperature limitation with vapor injection is removed with the Advanced Cheng Cycle, and therefore, I claim:

1. In a Cheng cycle, dual fluid heat engine of the type having:
    (i) a gas turbine engine including a compressor for compressing a first working fluid, having a compressor outlet, a combustion chamber in fluid communication with the compressor outlet, a turbine unit having an inlet in fluid communication with the combustion chamber for performing work by expansion of working fluid, and a turbine exhaust;
    (ii) a heat recovery steam generator coupled to the turbine exhaust for heating a second working fluid having a superheater with an outlet and an inlet, an evaporator having an outlet coupled to the superheater inlet and an evaporator inlet, a heat recovery boiler between the evaporator inlet and outlet having a drum;
    (iii) an injector for introducing heated second working fluid from the heat recovery steam generator into the gas turbine;
    (iv) a coolant inlet port for introducing coolant to at least one of turbine nozzles and blades in the gas turbine; and
    (v) control valve means for selectively throttling flow rate of second working fluid into the gas turbine connected upstream of the injector;
    (vi) a compressed gas source and pressure regulator selectively in communication with the drum;
    (vii) a sensor system coupled to gas turbine engine and the heat recovery steam generator for temperature and pressure detection; and
    (viii) a control system for operating fuel flow to the gas turbine;
    a method of operation of the heat engine comprising:
        (a) initializing start conditions in the gas turbine engine and the heat recovery steam generator with the control system;
        (b) setting the control valve means for idle flow condition of the heat engine;
        (c) pressurizing the drum with the compressed gas source to approximately the desired operating pressure of the heat recovery steam generator;
        (d) starting the gas turbine engine from idle to full load as limited by maximum allowed turbine inlet temperature; and
        (e) throttling second working fluid flow rate with the control valve means and shutting off the compressed gas source, after the sensor system indicates that heat recovery steam generator pressure is higher than compressor discharge pressure, the throttling being performed in accordance with the following operating parameters:
  (i) second working fluid temperature as injected into the turbine less than or substantially equal to first working fluid temperature at the compressor outlet, and
  (ii) maximization of heat recovery from the turbine exhaust for a given peak efficiency mixture ratio of second working fluid to first working fluid in the turbine, so that heat recovery exchanger pinch temperature is minimized.

2. The method of operating the Cheng cycle heat engine of claim 1, further comprising during shutdown of the engine:
  (a) unloading gas turbine engine output;
  (b) closing the control valve means to stop flow of second working fluid to the gas turbine engine;
  (c) shutting off fuel flow to the gas turbine engine with the control system; and
  (d) cooling down the boiler.

3. The method of operating the Cheng cycle heat engine of claim 1 wherein during the pressurizing step the compressed gas source utilized to pressurize the drum is an independent compressed gas source and the independent compressed gas source delivery pressure to the drum is set with the pressure regulator to be approximately five percent (5%) less than heat recovery steam generator operating pressure and the pressure regulator allows back flow of first working fluid to the compressed gas source when the drum pressure exceeds the compressed gas delivery pressure.

4. The method of operating the Cheng cycle heat engine of claim 3, wherein the independent compressed gas source is bottled nitrogen.

5. In a Cheng cycle, dual fluid heat engine of the type having:
  (i) a gas turbine engine including a compressor for compressing a first working fluid, having a compressor outlet, a combustion chamber in fluid communication with the compressor outlet, a turbine unit having an inlet in fluid communication with the combustion chamber for performing work by expansion of working fluid, and a turbine exhaust;
  (ii) a heat recovery steam generator coupled to the turbine exhaust for heating a second working fluid having a superheater with an outlet and an inlet, an evaporator having an outlet coupled to the superheater inlet and an evaporator inlet, a heat recovery boiler between the evaporator inlet and outlet having a drum;
  (iii) an injector for introducing heated second working fluid from the heat recovery steam generator into the gas turbine;
  (iv) a coolant inlet port for introducing coolant to at least one of turbine nozzles and blades in the gas turbine; and
  (v) control valve means for selectively throttling flow rate of second working fluid into the gas turbine connected upstream of the injector;
  (vi) a compressed gas source and pressure regulator selectively in communication with the drum;
  (vii) a sensor system coupled to gas turbine engine and the heat recovery steam generator for temperature and pressure detection; and
  (viii) a control system for operating fuel flow to the gas turbine;
a method of operation of the heat engine comprising:
  (a) initializing start conditions in the gas turbine engine and the heat recovery steam generator with the control system;
  (b) setting the control valve means for idle flow condition of the heat engine;
  (c) starting the gas turbine engine from idle to full load as limited by maximum allowed turbine inlet temperature;
  (d) pressurizing the drum with the compressor discharge of first working fluid to approximately the desired operating pressure of the heat recovery steam generator, so that the drum is pressurized and heated with gas turbine engine exhaust gas as the compressed gas source; and
  (e) throttling second working fluid flow rate with the control valve means and shutting off the compressed gas source, after the sensor system indicates that heat recovery steam generator pressure is higher than compressor discharge pressure, the throttling being performed in accordance with the following operating parameters:
    (i) second working fluid temperature as injected into the turbine less than or substantially equal to first working fluid temperature at the compressor outlet, and
    (ii) maximization of heat recovery from the turbine exhaust for a given peak efficiency mixture ratio of second working fluid to first working fluid in the turbine, so that heat recovery exchanger pinch temperature is minimized.

* * * * *